(No Model.)
B. BEAUPRE.
ANTI-FRICTION BEARING.
No. 427,538. Patented May 13, 1890.
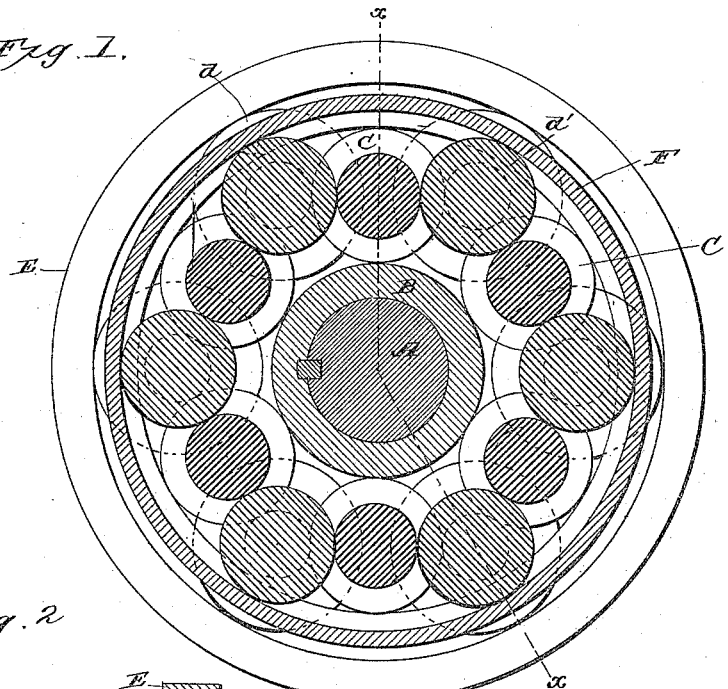
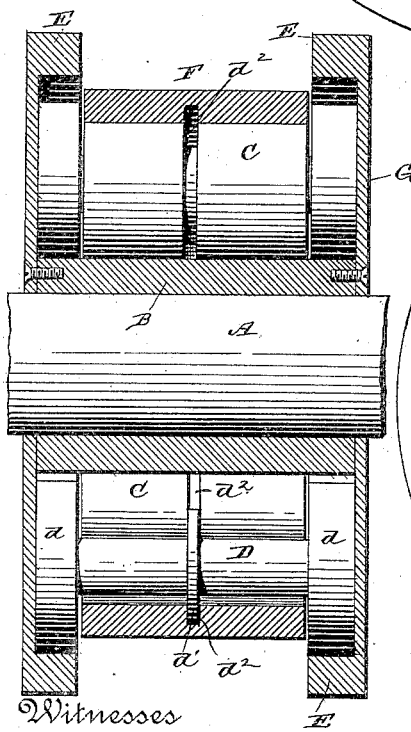
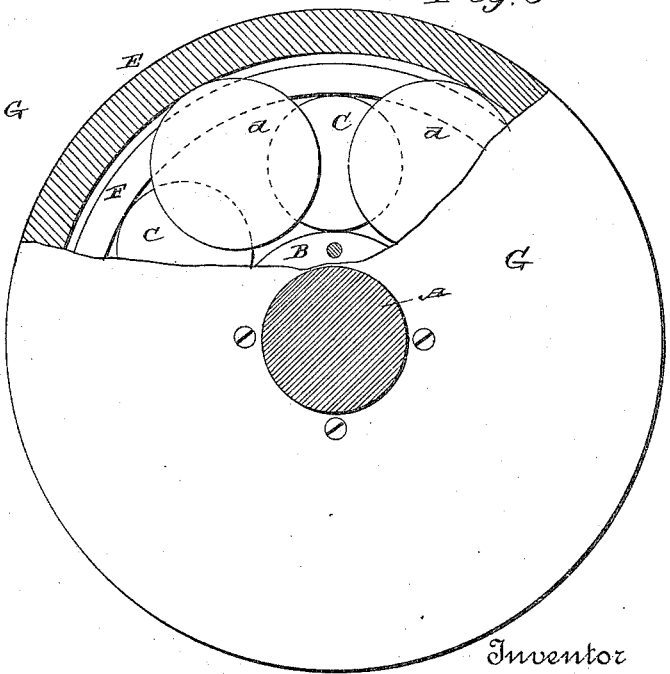
Witnesses
E. D. Smith
Alex J. Stewart
Inventor
Bruno Beaupre
By his Attorneys
Louis Fieser & Co

UNITED STATES PATENT OFFICE.

BRUNO BEAUPRE, OF ST. PAUL, MINNESOTA.

ANTI-FRICTION BEARING.

SPECIFICATION forming part of Letters Patent No. 427,538, dated May 13, 1890.

Application filed September 30, 1889. Serial No. 325,533. (No model.)

*To all whom it may concern:*

Be it known that I, BRUNO BEAUPRE, of St. Paul, in the county of Ramsey and State of Minnesota, have invented certain new and useful Improvements in Anti-Friction Bearings; and I do hereby declare the following to be a full, clear, and exact description of the same, reference being had to the accompanying drawings, forming a part of this specification, and to the letters of reference marked thereon.

This invention relates to improvements in that class of anti-friction bearings wherein the shaft is supported and caused to rotate in contact with traveling rollers; and it consists in certain novel and improved combinations and arrangements of parts, as hereinafter fully described, and pointed out in the claims.

My present invention is designed more especially as an improvement upon bearings such as are illustrated in my prior application, filed June 14, 1889, Serial No. 314,220.

In the accompanying drawings, Figure 1 is a sectional view of my improved bearing, taken on a plane at right angles to the shaft. Fig. 2 is a section on the line $x\,x$, Fig. 1. Fig. 3 is an end view of the bearing with the cover or end plate partly broken away to disclose the rollers.

Similar letters of reference in the several figures indicate the same parts.

Upon the shaft A is keyed or otherwise securely fastened a sleeve B, which constitutes the journal proper. Surrounding the sleeve or journal B are a series of bearing-rollers C, which rest upon and travel in contact with the periphery of the sleeve and between the latter and the inner cylindrical surface of a box F, surrounding the sleeve. These rollers C have no journals, but are retained in position and restrained from longitudinal movement by means of smaller spacing-rollers D. The smaller rollers D are arranged between the bearing-rollers C in contact with the peripheries thereof, and are each provided with cylindrical enlargements or heads $d$ at the ends, and with a central rib or core $d'$, but they have no journals. The heads $d$ rest upon and travel against the inner faces of bands E—one at each end of the bearings—while the rib or core $d'$ travels in grooves $d^2$ in the bearing-rollers C and the box F.

The bearing-rollers C are preferably made of a length equal to the height of the bearing F, and the spacing-rollers D extend beyond said bearing, with their heads $d$ overlapping the ends of the bearing and engaging the rings E, as shown. These rings or bands E are rigidly secured to the sleeve B, so as to move with the latter, and to effect such attachment, and at the same time inclose or cover the ends of the bearings, so as to exclude the entrance of dirt, &c., and produce a finished article, plates or caps G are formed upon or secured to the rings E and sleeve B, said plates being provided with central apertures fitting the shaft.

The sleeve B and rings E, being secured rigidly together, rotate in unison with the shaft A, which latter is supported within the bearing F, wholly upon the rollers C, while the spacing-rollers D traverse in contact with the rings or bands E, the enlargements or heads $d$ of said rollers being so proportioned to the number of revolutions and the length of the inner surface of the bands E as to enable them to travel around the latter without slip or friction; hence little or no lubricating material is required.

The spacing-rollers D are held in position within the bearing by the central rib engaging the walls of the groove in the bearing, while the bearing-rollers C are restrained from longitudinal movement or displacement by being received between the heads of the rollers D, as well as by the central ribs on said rollers.

It is obvious that slight changes in the details of construction may be made, as will be apparent to those skilled in the art, without departing from the spirit of my invention; but the form illustrated has been shown by actual trial to demonstrate a very high degree of efficiency, and to furnish a superior and economical bearing, one which requires the minimum quantity of lubricant, even when running at very high speeds, as all the bearing-points make rolling contacts.

Having thus described my invention, what I claim as new is—

1. In combination with the sleeve rigidly secured to the shaft, the box surrounding said sleeve, and the rings moving in unison with the sleeve, the bearing-rollers interposed between and co-operating with the sleeve and box, and the spacing-rollers provided with enlargements or heads engaging the rings beyond the bearing-rollers, substantially as described.

2. In combination with the sleeve rigidly secured to the shaft, the box surrounding the sleeve, and the rings attached to the sleeve at opposite ends of the box, the bearing-rollers interposed between the sleeve and box, and the spacing-rollers co-operating with the inner faces of the ring, substantially as described.

3. In combination with the sleeve secured to the shaft, the box surrounding the sleeve, and the rings at opposite ends of the box, mounted so as to rotate in unison with the shaft and its sleeve, the bearing-rollers co-operating with the box and sleeve, and the spacing-rollers provided with enlargements or heads at the ends, which overlap the ends of the bearing-rollers and travel upon the rings, substantially as described.

4. In combination with the sleeve, the surrounding box and the rings carried by the sleeve, the bearing-rollers interposed between and engaging the sleeve and box, and the spacing-rollers traveling upon the rings and provided with central ribs engaging the walls of grooves in the bearing-rollers and the box, substantially as described.

5. In combination with the sleeve applied to the shaft and supporting the rings and the box surrounding the sleeve between the rings, the bearing-rollers interposed between the sleeve and box, and the spacing-rollers provided with central ribs traversing grooves in the bearing-rollers and box, said spacing-rollers being also provided with enlargements or heads at the ends overlapping the ends of the bearing-rollers and traveling upon the rings, substantially as described.

6. In combination with the sleeve, the box surrounding the sleeve, the bearing-rollers interposed between the sleeve and box, and the spacing-rollers, the rings engaging the spacing-rollers, and the plates or heads uniting the rings and sleeve, substantially as described.

In testimony whereof I have hereunto set my hand in presence of two subscribing witnesses.

BRUNO BEAUPRE.

Witnesses:
 FRANK KEOGH, Jr.,
 E. C. PUFF.